United States Patent Office 3,234,142
Patented Feb. 8, 1966

3,234,142
OPTICAL BRIGHTENING AGENTS
Gerhard Wolfrum, Opladen, Rolf Pütter, Dusseldorf, and Hans-Gerhard Hanke and Karl-Heinz Menzel, Leverkusen, Germany, assignors to Farbenfabriken Bayer Aktiengesellschaft, Leverkusen, Germany, a German corporation
No Drawing. Filed May 21, 1963, Ser. No. 282,154
Claims priority, application Germany, May 25, 1962,
F 36,905
8 Claims. (Cl. 252—301.2)

The present invention relates to optical brightening agents; more particularly it concerns the use of pyrazoloquinoline compounds which are free of water-solubilizing groups and correspond to the general formula

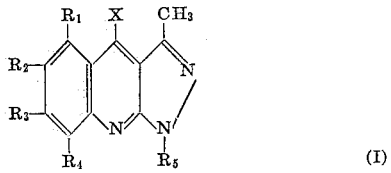

(I)

wherein $R_1$ to $R_4$, independently of one another, denote hydrogen, halogen, cyano, alkyl, aralkyl, acylamino, alkoxy and alkylsulphonyl groups or esterified carboxylic acid groups, and $R_5$ means optionally substituted alkyl, cycloalkyl, aralkyl or aryl radicals or heterocyclic radicals, whilst X stands for chlorine, bromine, alkoxy groups or optionally substituted aryloxy groups, as optical brightening agents for polyester materials, especially for materials from polyterephthalic acid glycol esters and for materials from cellulose acetates.

As representatives of the pyrazoloquinoline compounds to be used according to the invention there may be mentioned, for example, 1,3-dimethyl-4-chloro-pyrazolo[3,4-b]quinoline,
1-isopropyl-3-methyl-4-chloro-pyrazolo[3,4-b]quinoline,
1-tert. butyl-3-methyl-4-chloro-pyrazolo[3,4-b]quinoline,
1-propyl-3-methyl-4-bromo-pyrazolo[3,4b]quinoline,
1β-chlorethyl-3-methyl-4-chloro-pyrazolo[3,4-b] quinoline,
1-β-cyanoethyl-3-methyl-4-chloro-pyrazolo[3,4-b] quinoline,
1-β-carbethoxyethyl-3-methyl-4-chloro-pyrazolo[3,4-b] quinoline,
1-β-methane-sulphonyl-ethyl-3-methyl-4-chloro-pyrazolo [3,4-b]quinoline,
1-[thiacyclopentyl-1',1'-dioxide-(3')]-3-methyl-4-chloro-pyrazolo[3,4-b]quinoline,
1-benzyl-3-methyl-4-chloro-pyrazolo[3,4-b]quinoline,
1-β-acetoxyethyl-3-methyl-4-chloro-pyrazolo[3,4b-] quinoline,
1-cyclopentyl-3-methyl-4-chloro-pyrazolo[3,4-b] quinoline,
1,3-dimethyl-4,6-dichloro-pyrazolo[3,4-b]quinoline,
1,3-dimethyl-4-chloro-6-acetylamino-pyrazolo[3,4-b] quinoline,
1,3,8-trimethyl-4-chloro-pyrazolo[3,4-b]quinoline,
1-β-methane-sulphonyl-ethyl-3-methyl-4,5-dichloro-pyrazolo[3,4-b]quinoline,
1-(2'-chlorophenyl)-3-methyl-4-chloro-pyrazolo[3,4-b] quinoline,
1-β-methanesulphonyl-ethyl-6,8-dichloro-4-methoxy-pyrazolo[3,4-b]quinoline,
1,3-dimethyl-4-methoxy-pyrazolo[3,4-b]quinoline,
1,3-dimethyl-4-(2'-chloro-phenoxy)-pyrazolo[3,4-b] quinoline,
1-β-acetoxyethyl-3-methyl-4-butoxy-pyrazolo[3,4-b] quinoline and 1,3-dimethyl-4-methoxy-7-cyano-pyrazolo[3,4-b] quinoline.

Compounds of the above-mentioned Formula I wherein X stands for chlorine and bromine are obtainable, for example, by subjecting 5-(o-carboxy-phenyl-amino)-pyrazoles of the formula

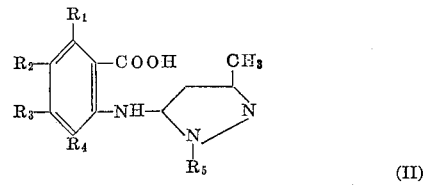

(II)

wherein $R_1$ to $R_5$ have the above-mentioned significance, or their salts, esters or amides to a thermal treatment and/or treatment with condensing agents such as phosphorus penta-chloride, phosphorus oxychloride, phosphorus trichloride, phosphorus tribromide, phosgene, thionyl chloride, or benzotrichloride. Suitable 5-(o-carboxy-phenyl-amino)-pyrazoles of the Formula II can be prepared by reacting oxazinones of the formula

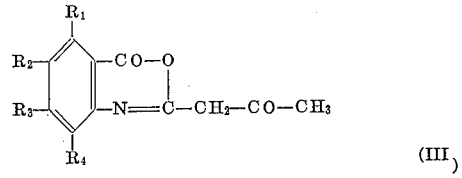

(III)

wherein $R_1$ to $R_4$ have the above-mentioned significance with hydrazines of the formula $$R_5NH-NH_2 \quad (IV)$$

wherein $R_5$ has the above-mentioned significance, for example according to the process of Belgian patent specification No. 602,539.

Compounds of the above-mentioned Formula I wherein X stands for alkoxy groups or for optionally substituted aryloxy groups are obtainable from suitable compounds wherein X stands for chlorine or bromine by reaction with alkali metal alcoholates or alkali metal phenolates, the corresponding alcohols or phenols being expediently used as solvents.

The brightening agents of the present invention can be applied in various ways, for example by treating the materials to be brightened such as fibres, filaments or fabrics, with an aqueous dispersion of the brightening agents at temperatures between 60 and 140° C., optionally with the addition of auxiliaries accelerating the absorption from aqueous dispersions, such as salicyclic acid methyl ester. On materials of polyterephthalic acid glycol esters the brightening agents can also be applied according to the thermosol process. Furthermore, the brightening agents may also be added to spinning or moulding masses which serve for the production of shaped articles from polyesters. The necessary amounts of pyrazoloquinoline compounds to be employed as brightening agents can easily be established by preliminary experiments; in general, 0.05 to 2% of brightening agent, referred to the material to be brightened, will be sufficient. If desired the optical brightening agents of the present invention can also be added to surface active agents suitable for washing polyester materials.

The brightening effects which are achieved by means of the pyrazoloquinoline compounds on polyester materials are distinguished by a neutral white shade and good fastness properties.

The following examples serve to illustrate the invention without, however, limiting its scope, the parts given are parts by weight.

Example 1

A solution of 0.8 part of 1,3-dimethyl-4-chloropyrazolo[3,4-b]quinoline in 10 parts of dimethyl formamide is stirred into 4000 parts of water containing 4 parts of the reaction product of 1 mol of p-tert.-butylphenol with 6–8 mols of ethylene oxide, acting as dispersing agent. After heating the aqueous dispersion thus obtained to 50° C., 100 parts of fibrous material from polyterephthalic acid ethylene glycol are introduced into the bath. The temperature of the bath is then slowly raised to boiling temperature and the polyester materials are agitated in the bath at boiling temperature for one hour, then thoroughly rinsed several times with water and finally dried. The fibres are then excellently brightened in a neutral white shade with good fastness properties.

The brightening effect can be somewhat increased by adding 2 parts of formic acid to the bath.

The pyrazoloquinoline compound employed is prepared in the following manner:

46.2 parts of 1,3-dimethyl-3-(o-carboxy-phenylamino)-pyrazole are introduced at room temperature, while stirring, into 100 parts of phosphorus oxychloride and stirred, intially at 40–50° C. for 1 hour, then at 115–120° C. for 2 hours. The reaction mixture is then cooled and stirred into 2000–3000 parts of water, the temperature being expediently allowed to rise to 40–60° C. by the exothermic reaction of the employed acid chloride with water. The resultant crystalline reaction product is filtered off after stirring for some time, and washed with water until acid free, after re-crystallisation from methanol, the product shows a melting point of 122–122.5° C.

A likewise outstanding brightening is attained by using, instead of the pyrazoloquinoline compound mentioned above, 1 - β - cyanoethyl - 3 -methyl - 4 - chloro-pyrazolo[3,4-b]quinoline, 1 - β - butoxyethyl - 3 - methyl-4-chloropyrazolo[3,4-b]quinoline, 1-isopropyl-3-methyl-4-chloropyrazolo[3,4-b]quinoline, 1,3,8-trimethyl-4-chloro-pyrazolo[3,4-b]quinoline, or 1-isopropyl-3,8-dimethyl-4-chloropyrazolo[3,4-b]quinoline; these compounds are obtainable from the correspondingly substituted 5-(o-carboxy-phenyl-amino)-pyrazoles and phosphorus oxychloride according to the instructions given above for the production of 1,3-dimethyl-4-chloropyrazolo[3,4-b]quinoline.

Example 2

A fabric of filaments or fibres produced from terephthalic acid glycol esters is padded on the foulard at room temperature with an aqueous dispersion containing per 1000 parts of water 0.8 part of 1-β-methane-sulphonyl-ethyl-3-methyl - 4 - chloro-pyrazolo[3,4-b]quinoline and 1 part of the reaction product of 1 mol of p-tert.-butylphenol with 6–8 mols of ethylene oxide, subsequently dried at 60° C. and then heated at 140° C. for 5 minutes. A very good brightening with a neutral white shade is thus obtained on the polyester fabric.

The pyrazoloquinoline compound employed is obtained in the following way:

A mixture of 64.6 parts of 1-β-methane-sulphonyl-ethyl-3-methyl-5-(o-carboxy-phenylamino) - pyrazole and 200 parts of phosphorus oxychloride is stirred at room temperature for 1 hour, then heated at boiling temperature for 2 hours and, after cooling, worked up according to the instructions given in Example 1.

Instead of the pyrazoloquinoline compound here employed, the 1 - β - methane - sulphonyl-ethyl-3-methyl-4-chloro-8-ethyl-pyrazolo[3,4-b]quinoline which is obtainable from 1-β-methane-sulphonyl-ethyl-3-methyl-5-(6'-ethyl-2'-carboxyphenyl-amino)-pyrazole and phosphorus oxychloride, or the 1,3-dimethyl-6,8-dichloro-4-methoxy-pyrazolo[3,4-b]quinoline may also be used as brightening agents with equally good results. The last-mentioned compound is prepared in the following way:

60 parts of 1,3-dimethyl-5-(4',6'-dichloro-2'-carboxy-phenyl-amino)-pyrazole are introduced, while stirring, into 150 parts of phosphorus oxychloride. After stirring the mixture first at room temperature for 1 hour, then at 100–110° C. for 2 hours, it is cooled and poured, with stirring, into 1000 parts of water, care being taken that the temperature does not rise above 45° C. When the whole of the phosphorus oxychloride has decomposed, the solution is adjusted to a pH value of about 4–5 with concentrated sodium hydroxide solution. The separated 1,3-dimethyl-4,6,8-trichloro-pyrazolo[3,4-b]quinoline is filtered off and washed with water until acid-free. 30 parts of the pyrazoloquinoline compound thus prepared are then heated in a solution of 3 parts of sodium in 250 parts of methyl alcohol at boiling temperature for 5 hours, while stirring. When the reaction solution has cooled down, 250 and 300 parts of water are added and the solution is cooled to 0–3° C. The precipitated 1,3-dimethyl-6,8-dichloro-4-methoxy-pyrazoloquinoline is filtered off and washed with water; after re-crystallisation from ethyl alcohol, it shows a melting point of 166–167° C.

Example 3

A solution of 0.5 part of 1-cyclopentyl-3-methyl-4-chloro-pyrazolo[3,4-b]quinoline in 10 parts of dimethyl formamide is stirred into 4000 parts of water containing 4 parts of the reaction product of 1 mol of p-tert.-butylphenol with 6–8 mols of ethylene oxide, and the dispersion thus obtained is treated with 3 parts of formic acid. Into this bath 100 parts of fibrous material from polyterephthalic acid ethylene glycol are introduced.

After slowly raising the temperature of the bath to boiling temperature, the polyester material is agitated in the bath at boiling temperature for 1 hour, then rinsed with water and finally dried. The fibrous material is excellently brightened and shows a greenish white shade.

The brightening agent used is produced from 1-cyclopentyl-3-methyl-5-(o-carboxyphenyl-amino)-pyrazole and phosphorus oxychloride according to the instructions given in Example 1 for the production of the brightening agent there employed.

Example 4

Filaments of cellulose acetate or a fabric produced therefrom are introduced at a goods-to-liquor ratio of 1:40 at 40° C. into the aqueous bath described in Example 1 which contains as brightening agent 1,3-dimethyl-4-chloropyrazolo[3,4-b]quinoline. The bath is gradually heated to 60° C. and the fibrous material left in the bath at this temperature for 30 minutes. The material is subsequently rinsed several times with water and then dried. The fibrous material is then excellently brightened and shows a neutral white shade.

Instead of the brightening agent here employed, there may also be used the 1-β-acetoxyethyl-3-methyl-4-chloro-pyrazolo[3,4-b]quinoline which is prepared from 1-β-acetoxyethyl - 3-methyl-5-(o-carboxyphenyl-amino)-pyrazole and phosphorus oxychloride according to the instructions given in Example 1 for the production of the brightening agent there employed.

It is also possible to use as brightening agent 1-[thiacyclopentyl - 1',1' - dioxide-(3')]-3-methyl-4-chloropyrazolo[3,4-b]quinoline or the 4-methoxy- compound obtainable therefrom by reaction with sodium methylate. The 1 - [thiacyclopentyl - 1',1'-dioxide-(3')]-3-methyl-4-chloro-pyrazolo[3,4-b]quinoline is obtainable by reacting 1 - [thiacyclopentyl-1',1'-dioxide-(3')]-3-methyl-5-(o-carboxyphenyl-amino)-pyrazole with phosphorus oxychloride according to the instructions given in Example 1 for the production of the brightening agent there employed.

Example 5

A fabric of filaments or fibres produced from terephthalic acid glycol esters is introduced at a goods-to-liquor ratio of 1:40 at 50° C. into an aqueous dispersion containing per 4000 parts of water 0.3 part of 1-β-cyanoethyl-3-methyl-4,7-dichloro-pyrazolo[3,4-b]quinoline and 4 parts of the reaction product of 1 mol of p-octylphenol with 6-8 mols of ethylene oxide. After raising the temperature of the bath slowly to boiling temperature the polyester fabric is agitated in the bath for one hour, then thoroughly rinsed several times with water and finally dried. The fabric is excellently brightened; the brightening achieved shows good fastness properties, in particular a good fastness to light.

The pyrazoloquinoline compound employed is prepared in the following manner:

A mixture of 6.1 parts of 1-β-cyanoethyl-3-methyl-5-(2'-carboxy-5'-chloro-phenylamino)-pyrazole and 150 parts of phosphorus oxychloride is stirred at 100° C. for 3 hours, then cooled and stirred into 2000–3000 parts of water. The temperature of the decomposition of the phosphorus oxychloride is kept below 10° C. by the addition of ice. Thereupon the reaction mixture is adjusted to a pH value of about 5 with concentrated sodium hydroxide solution and the separated 1-β-cyanoethyl-3-methyl-4,7-dichloro-pyrazolo[3,4-b]quinoline is filtered off and washed repeatedly with water. After re-crystallisation from acetic acid ethyl ester it shows a melting point of 195-196° C.

A likewise outstanding brightening is attained by using, instead of the pyrazoloquinoline compound mentioned above, 1,3-dimethyl-4,7-dichloro-pyrazolo[3,4-b]quinoline, 1-β-acetoxyethyl-3-methyl-4,7-dichloro-pyrazolo[3,4-b]quinoline, 1-carbethoxymethyl-3-methyl-4,7-dichloro-pyrazolo[3,4-b]quinoline, 1-benzyl-3-methyl-4,7-dichloro-pyrazolo[3,4-b]quinoline and 1-β-cyanoethyl-3-methyl-4,8-dichloro-pyrazolo[3,4-b]quinoline. These compounds are obtainable from the correspondingly substituted 5-(o-carboxy-phenyl-amino)-pyrazoles and phosphorus oxychloride according to the instructions given above for the production of 1-β-cyanoethyl-3-methyl-4,7-dichloro-pyrazolo-[3,4-b]quinoline.

*Example 6*

A fabric of filaments or fibres produced from terephthalic acid glycol esters is treated as described in Example 5, with the difference that instead of the pyrazolo-quinoline compound mentioned 0.4 part of 1,3-dimethyl-4-methoxy-7-chloro-pyrazolo[3,4-b]quinoline is applied. A likewise excellent brightening is obtained on the polyester fabric.

The 1,3-dimethyl-4-methoxy-7-chloro-pyrazolo-[3,4-b]quinoline is obtained by heating 1,3-dimethyl-4,7-dichloro-pyrazolo[3,4-b]quinoline with sodium methylate in methanolic solution; after re-crystallisation from methanol it shows a melting point of 130–131° C.

*Example 7*

A fabric of filaments or fibres produced from terephthalic acid glycol esters is washed at a liquor-to-goods ratio at 60–90° C. in an aqueous bath which contains per litre 5 g. of a mixture prepared from 0.4 part of 1,3-dimethyl-4,7-dichloro-pyrazolo[3,4-b]quinoline and 100 parts of a perborate-containing alkaline reacting commercial synthetic washing agent. After this treatment the fabric exhibits an appearance which is considerably whiter than the appearance of a fabric which is washed with the same washing agent to which no optical brightening agent was added.

Instead of the washing agent admixed with 1,3-dimethyl-4,7-dichloro-pyrazolo[3,4-b]quinoline there may also be used with equal success washing agents which contain as optical brightening agents 1,3-dimethyl-4-chloropyrazolo[3,4-b]quinoline, in-butyl-3-methyl-4-chloro-pyrazolo[3,4-b]quinoline or 1-dodecyl-3-methyl-4-chloro-pyrazolo[3,4-b]quinoline.

We claim:
1. An optical brightening composition for polyester materials consisting essentially of a compound having the formula

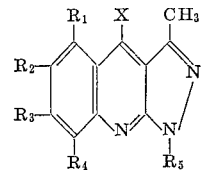

wherein $R_1$, $R_2$, $R_3$ and $R_4$ are independently defined as a member selected from the group consisting of hydrogen, halo, cyano, lower alkyl, and acetylamino; and $R_5$ is a member selected from the group consisting of alkyl having 1–12 carbon atoms, cyclopentyl, benzyl, chlorophenyl, thiacyclopentyl-1,1-dioxide, β-chloroethyl, β-cyanoethyl, β-carbethoxyethyl, β-methane-sulphonyl-ethyl, β-acetoxyethyl, and β-butoxy-ethyl; and X is a member selected from the group consisting of chloro, bromo, lower alkoxy, and chlorophenoxy.

2. An optical brightening composition consisting essentially of 1,3-dimethyl-4-chloro-pyrazolo[3,4-b]quinoline.

3. An optical brightening composition consisting essentially of 1,3-dimethyl-4,7-dichloro-pyrazolo[3,4-b]-quinoline.

4. An optical brightening composition consisting essentially of 1-β-cyanoethyl-3-methyl-4-chloro-pyrazolo[3,4-b]quinoline.

5. An optical brightening composition consisting essentially of ingredient 1-β-cyanoethyl-3-methyl-4,7-dichloro-pyrazolo[3,4-b]quinoline.

6. An optical brightening composition consisting essentially of 1-benzyl-3-methyl-4-chloro-pyrazolo[3,4-b]quinoline.

7. The method of claim 8 wherein the compound is applied to the polyester material in the form of an aqueous dispersion, at a temperature of about 60°–140° C.

8. A method of optically brightening polyester materials comprising treating said materials with a compound having the formula

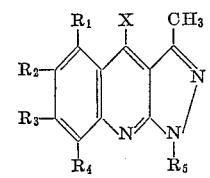

wherein $R_1$, $R_2$, $R_3$ and $R_4$ are independently defined as a member selected from the group consisting of hydrogen, halo, cyano, lower alkyl, and acetylamino; and $R_5$ is a member selected from the group consisting of alkyl having 1–12 carbon atoms, cyclopentyl, benzyl, chlorophenyl, thiacyclopentyl-1,1-dioxide, β-chloroethyl, β-cyanoethyl, β-carbethoxyethyl, β-methane-sulphonyl-ethyl, β-acetoxyethyl, and β-butoxy-ethyl; and X is a member selected from the group consisting of chloro, bromo, lower alkoxy, and chlorophenoxy; said compound being utilized in an amount of about .05–2% by weight of the material being treated.

References Cited by the Examiner

Hackh, "Chemical Dictionary," 2nd Ed., Blakiston, 1938, p. 21.

NICHOLAS S. RIZZO, *Primary Examiner.*